(12) United States Patent
Mayerle

(10) Patent No.: US 11,666,001 B2
(45) Date of Patent: Jun. 6, 2023

(54) WEED SEED DESTRUCTION

(71) Applicant: Dean Mayerle, Saskatoon (CA)

(72) Inventor: Dean Mayerle, Saskatoon (CA)

(73) Assignee: Tritana Intellectual Property Ltd., Saskatoon (CA)

( * ) Notice: Subject to any disclaimer, the term of this patent is extended or adjusted under 35 U.S.C. 154(b) by 377 days.

(21) Appl. No.: 16/817,190

(22) Filed: Mar. 12, 2020

(65) Prior Publication Data

US 2020/0296896 A1    Sep. 24, 2020

Related U.S. Application Data

(60) Provisional application No. 62/818,417, filed on Mar. 14, 2019.

(51) Int. Cl.
| | | |
|---|---|---|
| *A01F 12/40* | (2006.01) | |
| *A01F 12/44* | (2006.01) | |
| *A01D 41/12* | (2006.01) | |
| *B02C 15/12* | (2006.01) | |
| *B02C 13/288* | (2006.01) | |
| *A01D 41/127* | (2006.01) | |
| *B02C 13/16* | (2006.01) | |

(52) U.S. Cl.
CPC .......... *A01F 12/40* (2013.01); *A01D 41/1243* (2013.01); *A01F 12/442* (2013.01); *A01D 41/1271* (2013.01); *B02C 13/16* (2013.01); *B02C 13/288* (2013.01); *B02C 15/12* (2013.01)

(58) Field of Classification Search
CPC ... A01F 12/40; A01F 12/442; A01D 41/1243; A01D 41/1271; A01M 21/02; B02C 13/16; B02C 13/288; B02C 15/12
See application file for complete search history.

(56) References Cited

U.S. PATENT DOCUMENTS

| | | |
|---|---|---|
| 2,064,689 A | 12/1936 | Russwurm |
| 2,557,865 A | 6/1951 | Emmanouilidis |
| 2,775,174 A | 12/1956 | Everett |
| 3,071,246 A | 1/1963 | Schimke |
| 3,448,933 A | 6/1969 | Roy |
| 3,894,695 A | 7/1975 | Benedikter |

(Continued)

FOREIGN PATENT DOCUMENTS

| | | |
|---|---|---|
| AU | A-37966/95 | 5/1996 |
| AU | 200138781 | 10/2001 |

(Continued)

*Primary Examiner* — Arpad F Kovacs
*Assistant Examiner* — Arpad Fabian-Kovacs
(74) *Attorney, Agent, or Firm* — Adrian D. Battison; Ade & Company Inc.; Ryan W. Dupuis

(57) ABSTRACT

Weed seeds are destroyed in the chaff from a combine harvester by repeated high speed impacts caused by a rotor mounted in one of a pair of side by side housings which accelerate the discarded seeds in a direction centrifugally away from the rotor onto a stator including angularly adjustable stator surfaces around the axis. Thus the discarded seeds rebound back and forth between the rotor and the stator to provide a plurality of impacts. The destructor is mounted on a suitable drive shaft within the straw path and the chaff and weed seed material is carried from the rear end of the sieve to the destructor on the straw chopper by one or more fans driving the material through a transfer duct.

29 Claims, 13 Drawing Sheets

(56) References Cited

U.S. PATENT DOCUMENTS

| | | | |
|---|---|---|---|
| 4,591,102 A | 5/1986 | Clarke | |
| 4,637,406 A | 1/1987 | Guinn | |
| 4,711,253 A | 12/1987 | Anderson | |
| 4,917,652 A | 4/1990 | Glaubitz | |
| 4,923,431 A | 5/1990 | Miller | |
| 5,425,507 A | 6/1995 | Stumpff | |
| 5,556,042 A | 9/1996 | Roberg | |
| 5,944,604 A | 8/1999 | Niermann | |
| 6,500,064 B1 | 12/2002 | Schrattenecker | |
| 6,547,169 B1 | 4/2003 | Matousek | |
| 6,656,038 B1 | 12/2003 | Persson | |
| 6,685,558 B2 | 2/2004 | Niermann | |
| 6,840,854 B2 * | 1/2005 | Redekop | A01F 12/40 460/112 |
| 6,908,379 B2 | 6/2005 | Gryspeerdt | |
| 8,152,610 B2 * | 4/2012 | Harrington | B02C 13/288 460/111 |
| 8,167,691 B2 | 5/2012 | Pohlmann | |
| 8,210,915 B2 | 7/2012 | Holmen | |
| 8,789,785 B2 | 7/2014 | Lelas | |
| 9,497,903 B2 | 11/2016 | Biggerstaff | |
| 9,635,813 B2 | 5/2017 | Dilts | |
| 9,686,916 B2 | 6/2017 | Biggerstaff | |
| 9,723,790 B2 | 8/2017 | Berry | |
| 9,730,390 B2 | 8/2017 | Maes | |
| 9,949,434 B2 | 4/2018 | Baes | |
| 10,004,176 B2 * | 6/2018 | Mayerle | A01F 12/40 |
| 10,314,232 B2 | 6/2019 | Isaac et al. | |
| 10,653,069 B2 | 5/2020 | Farley | |
| 2003/0003974 A1 * | 1/2003 | Niermann | A01D 41/1243 460/111 |
| 2003/0114207 A1 | 6/2003 | Wolters | |
| 2004/0132517 A1 | 7/2004 | Weihholdt | |
| 2005/0277454 A1 | 12/2005 | Couture | |
| 2010/0291985 A1 | 11/2010 | Pohlmann | |
| 2011/0059782 A1 | 3/2011 | Harrington | |
| 2014/0364179 A1 | 12/2014 | Brinkmann | |
| 2015/0373913 A1 * | 12/2015 | Berry | A01D 41/12 460/149 |
| 2016/0044869 A1 | 2/2016 | Mayerle | |
| 2016/0044870 A1 | 2/2016 | Mayerle | |
| 2016/0113202 A1 | 4/2016 | Mayerle | |
| 2016/0150727 A1 | 6/2016 | Mayerle | |
| 2016/0150728 A1 | 6/2016 | Duquesne | |
| 2017/0079207 A1 | 3/2017 | Puryk | |
| 2017/0238463 A1 | 8/2017 | Van de Wege | |
| 2018/0070534 A1 * | 3/2018 | Mayerle | A01D 69/00 |
| 2018/0249641 A1 | 9/2018 | Lewis | |
| 2018/0317392 A1 | 11/2018 | Mayerle | |
| 2018/0368319 A1 * | 12/2018 | Desmet | A01F 12/40 |
| 2019/0174677 A1 | 6/2019 | Ricketts | |
| 2020/0296896 A1 | 9/2020 | Mayerle | |
| 2021/0022289 A1 | 1/2021 | Berry | |
| 2021/0282329 A1 | 9/2021 | Hall | |

FOREIGN PATENT DOCUMENTS

| | | | | |
|---|---|---|---|---|
| AU | 2014218502 | | 9/2015 | |
| AU | 2017228663 A1 * | | 10/2017 | A01D 41/12 |
| AU | 2018100350 | | 5/2018 | |
| AU | 2018100350 A4 * | | 5/2018 | A01D 41/1271 |
| AU | 2019202177 A1 * | | 10/2019 | B02C 15/12 |
| CN | 20244482 | | 9/2012 | |
| DE | 382632 | | 10/1923 | |
| DE | 102006040255 | | 4/2007 | |
| DE | 102009042002 A1 * | | 3/2011 | A01D 41/1243 |
| DE | 102011088512 | | 1/2013 | |
| DE | 102018131432 A1 * | | 6/2020 | A01D 41/1243 |
| EP | 1027820 | | 8/2000 | |
| EP | 1191835 | | 4/2002 | |
| EP | 1442649 | | 8/2004 | |
| EP | 1905291 | | 4/2008 | |
| EP | 2976937 | | 1/2016 | |
| EP | 3172959 | | 5/2017 | |
| EP | 3520596 | | 8/2019 | |
| GB | 1062209 | | 3/1967 | |
| WO | WO 01/01754 | | 1/2001 | |
| WO | WO-2008156419 | | 12/2008 | |
| WO | WO-2009100500 | | 8/2009 | |
| WO | WO-2014127408 | | 8/2014 | |
| WO | WO2017/008161 | | 1/2017 | |
| WO | WO-2018053600 A1 * | | 3/2018 | B02C 13/16 |
| WO | WO-2019178651 A1 * | | 9/2019 | A01F 12/40 |
| WO | WO-2020160622 | | 8/2020 | |

\* cited by examiner

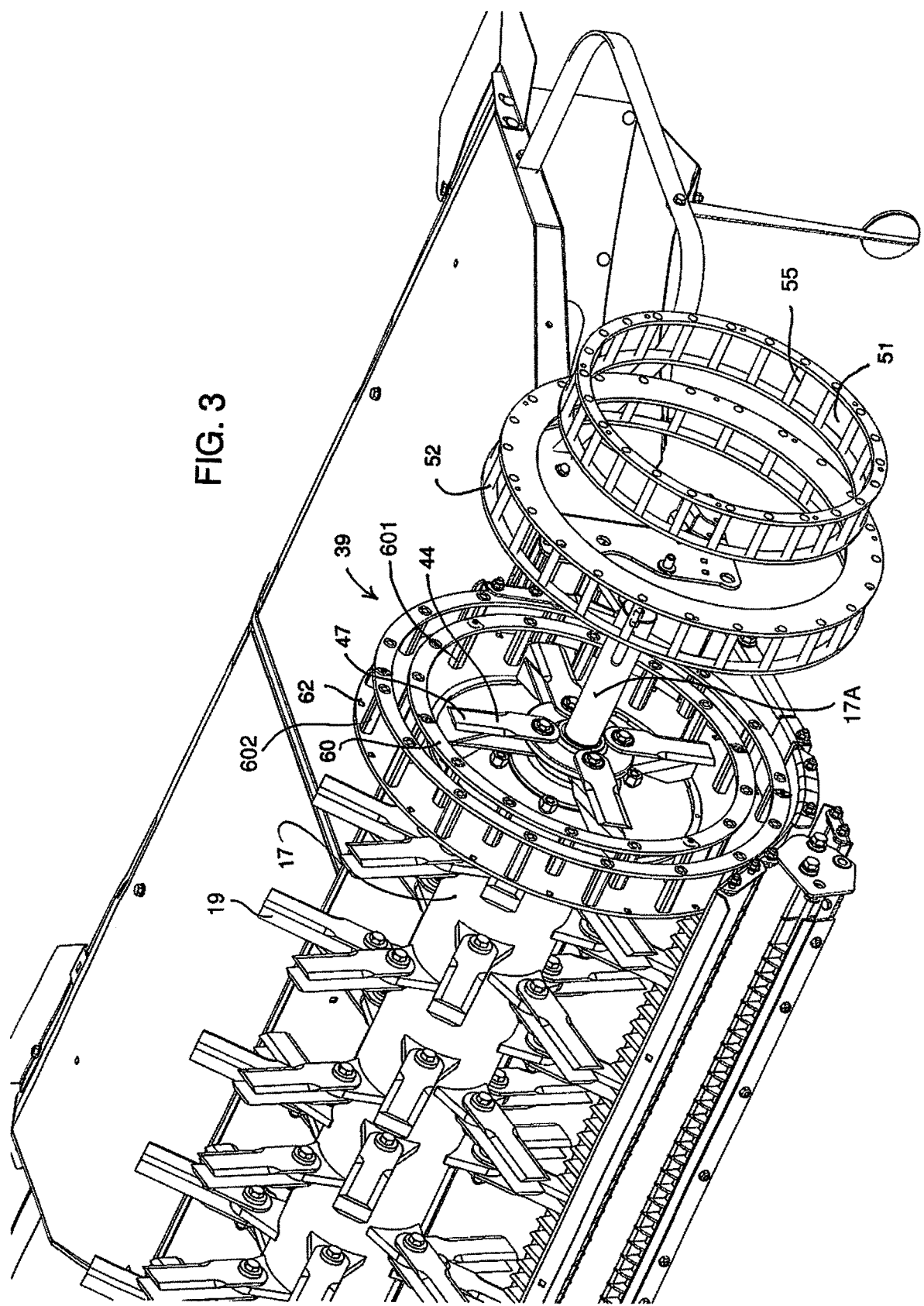

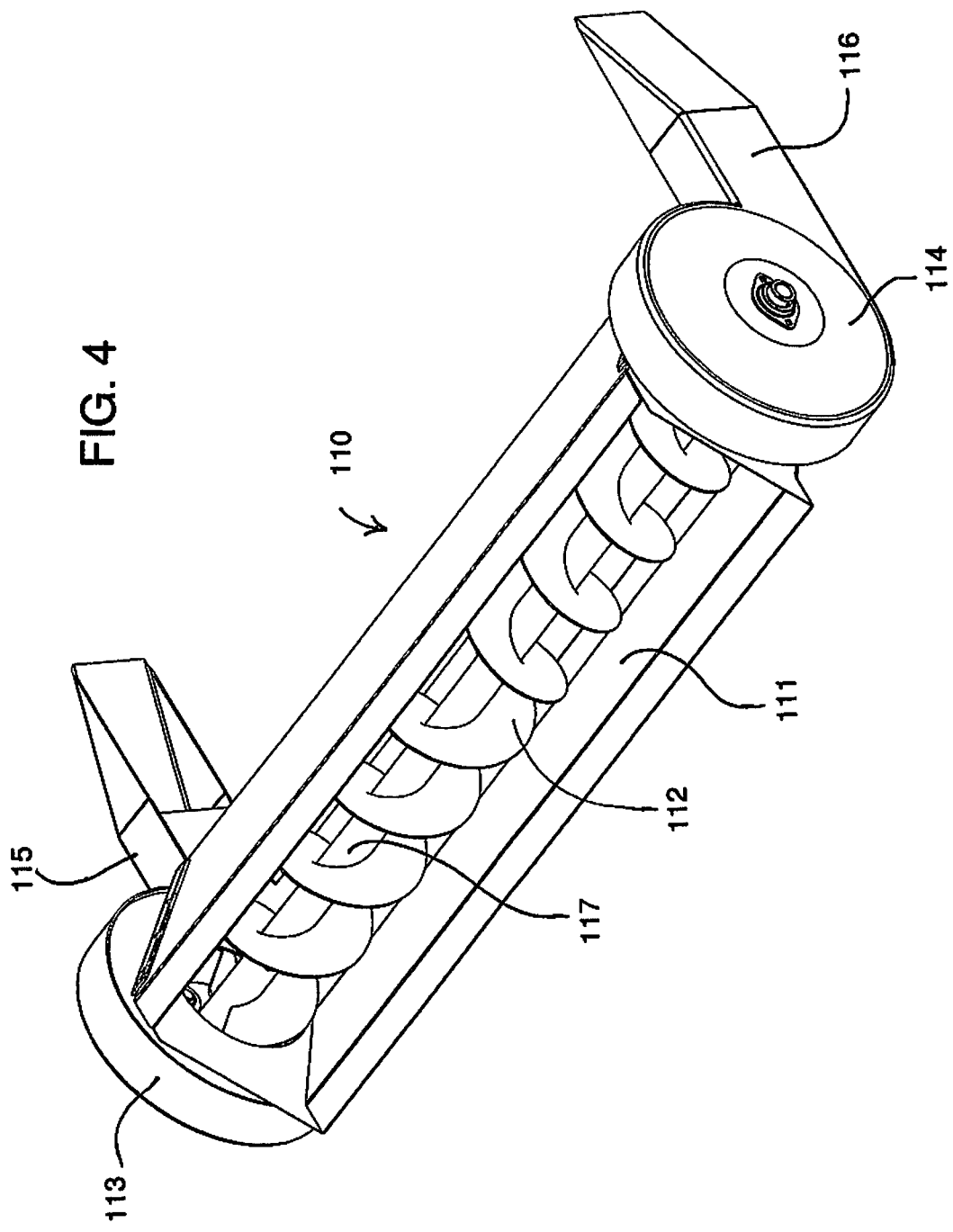

WEED SEED DESTRUCTION

This application claims the benefit under 35 USC 119(e) of provisional application 62/218,417 filed Mar. 14, 2019.

This invention relates to a weed seed destructor which can be attached to a combine harvester so that weed seeds in the discharged chaff can be devitalized before being spread onto the ground.

BACKGROUND OF THE INVENTION

In U.S. Pat. No. 10,004,176 published Jun. 26, 2018 and US Publication 2018/0070534 published Mar. 15, 2018 discloses an arrangement in which weed seeds are destroyed in the chaff from a combine harvester by a rotary mill causing repeated high speed impacts by a rotor mounted in one of a pair of side by side housings which accelerate the discarded seeds in a direction centrifugally away from the rotor onto a stator including angularly adjustable stator surfaces around the axis. Thus the discarded seeds rebound back and forth between the rotor and the stator to provide a plurality of impacts. The angle of the discharge around the rotor axis can be changed to direct the seeds to the side of the combine away from a straw chopper, towards the guide fins of the tailboard of the chopper, or into the housing of the straw chopper.

SUMMARY OF THE INVENTION

According to one aspect of the invention there is provided a combine harvester comprising:
a separation system for separating harvested crop into a first material comprising straw and a second material comprising chaff and weed seeds;
a rotary member mounted on the combine harvester at a location thereon to engage the first material comprising the straw, the rotary member including a rotor shaft;
at least one weed seed destructor section comprising:
an inlet receiving the second material comprising chaff and weed seeds;
first and second surfaces engaging the second material comprising chaff and weed seeds;
the first and second surfaces being mounted for relative rotation such that the second material comprising chaff and weed seeds is impacted between said first and second surfaces;
wherein the rotor shaft of the rotary member is a drive shaft for the destructor section.

The weed seed destructor section can be of many different types. Examples can include:
the arrangements shown and described herein;
U.S. Pat. No. 8,152,610 (Assignee: GRDC|Inventor: Harrington|2008) details a large and heavy weed seed destructor mill which is mounted on a mobile frame, powered by a separate engine and is pulled behind a combine harvester. The mill is made with two counter rotating rotors. Chaff and weed seeds are collected from the combines sieves and blown from the harvester to trailing unit. The chaff and weed seeds enter the center of the rotating rotors and pass through the multiple counter rotating rings causing damage and devitalization to any seeds in the chaff. The residue is then spread out behind the trailed unit.

WO 2014/127408 (Applicant: GRDC|Inventors: Berry/Saunders|2014) discloses a further development that was made following the GRDC machine discussed above. However, unlike the machine discussed above, it discloses a weed seed destructor unit which is mounted on the combine harvester behind the sieves. The weed seed destructor mill has a circular array of stationary bars positioned at an angle to the rotation of a rotor, such that there are blunt hits (i.e. impacts) to deflect seeds back into the rotation of the rotor while the seeds and the chaff pass through the destructor. The residue passes through multiple rings of stationary and rotating bars which inflict damage on any seeds in the chaff. The residue is then spread out to the sides of the harvester.

AU 2016/903873 (Applicant: Seed Terminator Holdings|Inventor: Berry|2016) discloses a multistage hammer mill. Like the above it is mounted on the combine harvester behind the sieves. Rather than multiple rings of a circular array of stationary bars positioned at an angle to the rotation of a rotor it incorporates multiple rings of screens. Like a hammer mill, the rotor grinds, shears and impacts any seed in the chaff until it can pass through the screen aperture. The residue passes through multiple rings of stationary screens and rotating bars which inflict damage on any seeds in the chaff. The residue is then spread out to the sides of the harvester.

AU 2016/050802 (applicant: Tecfarm|Inventor: Lewis|2016) discloses two parallel rotors with blunt flails radially extending on each rotor. It is shown that the effective tip diameter of the blunt flails are close to or intersecting each other. The rotors turn in opposing directions such that the tip velocity causes impact and devitalization of seeds in the chaff. The patent discloses the seed destruction device on a separate trailed unit however it is known that Tecfarm has mounted this type of destructor mill on a combine harvester at the rear end of the sieves.

The disclosure of each of the above cited patent documents is incorporated herein by reference. The concept herein can be used in any weed seed destructor design which uses a rotating body. In some cases the rotating body cooperates with a stator. The stator can include bars which deflect the seeds as they pass between the bars. The stator can include surrounding surfaces which cause the seeds to bounce back into the path of the rotor. In some cases the rotating body cooperates with another rotating body.

The arrangement described herein can provide one or more of the following advantages:
to provide an improved construction of a weed seed destructor which provides a simple and efficient construction at lower cost.
the reduction of operating power,
an increase in spreading efficiency,
reduced spatial requirement on the combine harvester,
additional foreign object protection for the weed seed destructor. The housing for the auger flighting can be designed so that the bottom of the housing is not tight to the auger flighting. The high speed of the auger flighting will drive any heavy objects—rocks or metal—into the void (or rock trap) allowing the auger to only move the lighter chaff.

Preferably at least one of the first and second surfaces is mounted on said rotor shaft for rotation therewith. That is the destructor section is in effect driven by the rotor shaft in that, where the destructor comprises a rotor and a stator, the rotor can be mounted on the shaft for rotation therewith while the stator surrounds the rotor.

Preferably there is provided a transfer system to move the second material from the second location to the weed seed destructor section.

In one example, the destructor could comprise two rotors where one rotor is mounted on the shaft as defined herein and another one rotor can be mounted on a shaft of the transfer system. That is a destructor rotor can be mounted on each end of the transfer device with each discharging into a destructor rotor mounted on rotor as defined herein which can be the rotor of the straw chopper.

Preferably the transfer system comprises at least one duct and a blower arrangement for blowing the second material along the duct.

Alternately the transfer system could comprise at least one duct with a screw or paddle conveyor.

Preferably the rotor shaft and the transfer system are driven by a belt for receiving drive from an output shaft of the combine harvester. Alternatively, as the transfer system does not consume a lot of power, it could be driven by hydraulics which can therefore easily be turned on and off.

Preferably the drive system incorporates a method to decouple the transfer system to reduce power when not required.

Preferably there is a common drive from the combine harvester to the chopper rotor of the straw chopper section and the shaft of said transfer system.

Preferably the transfer system is driven from the rotor shaft.

Preferably the transfer system comprises an intake in front of a housing of the rotor.

Preferably the system includes a method to allow the second material to bypass the transfer system when not required.

Preferably the transfer system comprises a housing which is connected to the housing of the rotor.

Preferably the transfer system housing is mounted to the housing of the rotor.

Preferably the transfer system comprises an auger flight arrangement for moving the second material outwardly to at least one side of the combine harvester to said blower arrangement and duct to convey the second material to the rotor seed destruction section. Alternately the transfer system could be a conveyor belt, air flow conveyor or contain individual paddles on the shaft to urge the material to the chopper rotor.

Preferably the auger flight of said transfer system is mounted on a shaft which drives the blower arrangement.

Preferably the auger flight is arranged to move the second material to each side of the combine harvester and wherein there is provided a blower arrangement at each side.

Preferably the blower arrangement is located outside the end of the rotor housing and duct extends outside an end wall of a housing of the rotor.

Preferably the rotor shaft carries a plurality of straw engaging members for engaging the straw.

Preferably the destructor section is located at a position on the rotor shaft axially separated from the straw engaging members.

Preferably the destructor section is located at a respective end of the rotor shaft.

Preferably the weed seed destructor comprises a first weed seed destructor section at a first end of the rotor shaft and a second weed seed destructor section at a second end of the rotor shaft.

Preferably the weed seed destructor includes a common discharge with the first material.

Preferably the at least one weed seed destructor is arranged to expel the second material into a secondary spreading device.

Preferably the secondary spreading device comprises a tailboard with a plurality of fins.

Alternately the secondary spreading device could include powered spreading discs.

The shaft can comprise any one of the shafts of the combine harvester so that in one arrangement the rotor is a rear straw chopper; in another arrangement the rotor is an internal straw chopper; in another arrangement the rotor is an internal beater and in yet another arrangement the rotor is a dedicated shaft for the seed destructor only.

Preferably the weed seed destructor comprises at least one cutting blade and at least fan blade in the inlet for cutting material other than chaff in the second material.

Preferably the fan blade creates enough airflow to spread both the first and second material.

Alternatively, additional fan blades can be attached to the straw side of the seed destructor rotor to provide additional airflow.

Alternatively, additional fan blades or blades with a larger effective frontal width than the leading edge can be mounted to the rotor to increase airflow.

Preferably the airflow accelerates both materials into the secondary spreading device. Preferably the stator or stators comprises a plurality of stator bars at angularly spaced positions around the axis of the rotor;

each stator bar extending axially along the axis of the rotor and being spaced from a next adjacent stator bar to provide an axially extending space therebetween through which weed seeds can pass;

each stator bar comprising an elongate member which is L-shaped in cross-section to define a first leg lying in a cylindrical surface surrounding the axis of the rotor and a second leg extending outwardly from the cylindrical surface connected to the first leg at an apex at a leading end of the first leg relative to the direction of rotation of the rotor.

Preferably the apex is smoothly curved at the junction between the first leg and the second leg so it defines a radius of curvature where the radius of curvature can lie in the range 5 to 10 mm.

As an alternative, the apex is not smoothly curved but instead includes a portion of the surface which is at an inclined angle relative to the first leg so as to tend to reflect the weed seeds when impacting thereon at an inclined angle back toward the rotor. That is both the smoothly curved apex and the inclined portion provide a portion of the surface where the seeds which move outwardly from the edge of the rotor blades are reflected back into the rotor for further impacts to be generated. It will be appreciated that the seeds tend to rebound from a surface generally at an angle of rebound which is equal to an angle of impact so that a surface at 45 degrees to the first leg will tend to rebound the seeds back into the rotor rather than tangentially of the rotor.

Preferably the second leg extends outwardly from the apex to define a portion thereof beyond an outer end of the apex. In this way the formation of the stator bar can be obtained very easily by bending a sheet metal strip along a center line forms two legs where the first lies in the cylindrical surface and the second extends outwardly typically at right angles to the first. However the legs may be of different lengths with particularly the second leg being very short or hardly existent.

Preferably the second leg lies at an angle to the first leg which is at right angles to the first leg. However the second leg can be bent through more than 90 degrees so that it is at an angle to the first leg which is less than right angles to the first leg. This forms the apex portion into a smooth part cylindrical body wrapped around from the first leg to the second leg. It will be appreciated that the impacts from the seeds on the stator bars occur over those parts facing inwardly into the rotor including the first leg and the apex portion. Impacts on the second leg do not interfere with the path of the seeds as they are already moving outwardly from the stator.

Alternately the second leg can be bent at an angle less than 90 degrees so that the angle between the first and second leg is greater than 90 degrees. In this case all impact surfaces will tend to reflect the seed back to the rotor creating a higher devitalization rate with higher power requirements.

Typically the stator bars lie in a line parallel to the axis so that the apexes are directly parallel to the rotor axis. However the stator bars can be inclined to the line parallel to the axis at the cylindrical surface so that they are all tilted to the left or right. Where the bars are parallel to the axis, typically the second legs lies in an axial plane of the axis of the rotor.

Preferably the width of the first leg in the cylindrical surface is in the range 10 to 20 mm. Preferably the spacing between each bar and the next at the cylindrical surface lies in the range 10 to 50 mm. The width of the first legs relative to the spacing between the trailing edge of each bar and the apex of the next controls the amount of material which is allowed to escape between the bars. Increasing the length of the legs and/or decreasing the spaces increases the amount of material which remains inside the stator and thus increases the number of impacts and the power requirement for moving the material. Conversely the power can be reduced by increasing the proportion of space to leg but with consequent reduction in impacts and hence reduction in seed destruction. These ratios can be selected depending on the amount and type of seeds to be treated.

While the dimensions of the second leg in the outward direction have little effect on the operation, typically the width of the second leg in the outward direction is in the range 10 to 20 mm.

Preferably the outer edge of each of the second legs lies in a common imaginary cylinder surrounding said cylindrical surface as this makes the manufacture of symmetrical stator bars by bending sheet metal strips a more effective method.

Preferably the stator bars extend along a full height of rotor so that the height of the stator matches that of the rotor. However stators can be stacked one on top of another where the rotor is of increased height.

Preferably the first and second legs of the stator bar comprise portions which are flat as this allows a simple bending of a flat strip to form the bars.

Preferably each of the stator bars comprises a sheet metal plate which is bent to form the two legs. However other materials and methods of manufacture can be used.

Preferably the stator construction includes a stator support member and a plurality of angularly spaced stator portions mounted on the support member where the stator support member is cylindrical so as to surround the axis of the rotor and the stator portions are part cylindrical with each of the plurality of stator portions extending around a part only of the periphery of the support member. Each such portion includes a plurality of the stator bars.

In this arrangement preferably there is provided a discharge opening between each stator portion and the next.

This construction of separate replaceable stator portions allows a plurality of the stator portions to be provided having different characteristics which can be selected for different weed seed sizes and amounts. The selection of the portion also can be used to change power requirements.

In particular, the different characteristics or the portions to the used in any circumstance relate to the length of the first leg of the stator bars around the axis and/or the spacing between the stator bars around the axis.

This construction of part cylindrical stator portions allows the portions to be hard surface coated as a separate component from the support member. To provide an effective mounting of the separate portions, preferably each of the stator portions comprises mounting edges at angularly spaced ends of the portion for attachment to a rail of the support member. This can be used with a support structure which comprises a top and bottom ring around the axis of the rotor with a plurality of rails parallel to the rotor axis.

In some cases the stator includes a plurality of discharge openings at angularly spaced positions around the stator with the support member being angularly adjustable around the rotor axis to move the openings.

In most cases there is provided inner and outer coaxial cylindrical stators where preferably at least one of inner and outer stators is adjustable to change the angular relationship therebetween. Preferably the angular position of at least one of the stators is adjustable by a control linkage from a cab of the combine harvester.

Preferably there are provided rotor components between the inner and outer stators.

Preferably the rotor comprises a hub carrying rotor blades defining said rotor surfaces where the blades are pivotally mounted about an axis parallel to the rotor axis so as to act as flails.

Preferably the rotor comprises a plurality of blades where an outer surface of each blade has a leading edge which is closest to the cylindrical surface and tapers away from the cylindrical surface toward a trailing edge.

The arrangement herein thus in one example provides three stator rings where on the outer ring there are six stator inserts. Some or all of the inserts have an additional release opening, in addition to the spaces between the stator bars to allow material in the impact mill the ability to escape from inside the stator to the next stage, thus reducing horsepower. The openings can be located within the stator insert or can be located between each insert and the next.

The middle ring has five inserts so as to define a larger gap between the stator bars. The inner ring has four inserts so as to form a yet larger gap between the stator bars. All the stator bars in each of the inserts have the same profile, formed for example with a 7 mm leading radius and 20 mm legs at 90 degrees apart. The apex is preferable smoothly curved without a sharp intersection between the legs since a sharp point would risk material hanging up on the edge which would act to increase power requirements.

The user can set a predetermined balance between the seed kill rate and power requirements, both of which are dependent on the number of impacts and thus the ratio of the openings to bars in the stator.

Thus all rings can incorporate larger spaces or additional release openings as are provided on the outer ring. If there is a reason to increase the kill rate on a small weed seed, this ratio of opening area to impact area can be adjusted by selecting bars where the first or tangential legs are increased in length or by reducing the gaps between the stator bars and/or eliminating or reducing the additional release openings on the outer ring to increase the time the weed seed spends being impacted in the mill.

According to another feature which can be used herein there is provided an apparatus for destroying weed seeds comprising:

a housing arranged to be mounted at a location on a combine harvester for receiving a feed material containing separated chaff and weed seeds separated by the combine harvester from harvested crop;

a rotor mounted in the housing for rotation in a direction of rotation about a rotor axis, the rotor including rotor surfaces thereon for engaging the feed material and for accelerating the feed material in a direction outwardly from the axis of the rotor;

at least one stator arranged at a location outwardly of the axis for engaging the weed seeds in the accelerated feed material;

said at least one stator comprising a plurality of stator bars at angularly spaced positions around the axis of the rotor;

each stator bar comprising an elongate member extending axially along the axis of the rotor and being spaced from a next adjacent stator bar to provide an axially extending space therebetween through which weed seeds can pass;

wherein at least one stator bar comprises a first surface tangential to the rotor axis joined to a curved apex surface joined to a second surface extending generally outwardly from the rotor axis.

Preferably the second surface of the stator bar is substantially perpendicular to the tangential surface.

Preferably the first and second surfaces of the stator bar are substantially flat.

Preferably the first surface of the stator bar has a length in the tangential direction which is greater than 10 mm.

Preferably the first surface of the stator bar has a length in the tangential direction which is at least equal to a length of the second surface in the radial direction.

Preferably the first surface has a length of the stator bar in the tangential direction which is at least equal to the spacing between the bars in the tangential direction.

Preferably the spacing between the bars in the tangential direction is at least equal to the length of the second surface in the radial direction.

Preferably the spacing between two of the bars in the tangential direction is greater than the spacing between others of the bars.

According to another object of the invention there is provided a combine harvester comprising:

a separation system for separating from harvested crop at a first discharge location a first material comprising straw and at a second discharge location a second material comprising chaff and weed seeds;

a rotor mounted on the combine harvester at a location thereon to engage the first material, the rotor including a rotor shaft;

at least one weed seed destructor section comprising:
rotor surfaces arranged for rotation about an axis to engage the second material for accelerating the second material in a direction outwardly from the axis;
at least one other surface arranged for engaging the accelerated second material such that the accelerated second material is impacted between said rotor surfaces and said at least one other;
said rotor surfaces being mounted on said rotor shaft for rotation therewith.

Preferably there is provided a transfer system to move the second material from the second location to the weed seed destructor section.

According to another object of the invention there is provided a combine harvester comprising:

a separation system for separating from harvested crop at a first discharge location a first material comprising straw and at a second discharge location a second material comprising chaff and weed seeds;

a rotor mounted on the combine harvester at a location thereon to engage the first material, the rotor including a rotor shaft;

at least one weed seed destructor section comprising:
rotor surfaces arranged for rotation about an axis to engage the second material for accelerating the second material in a direction outwardly from the axis;
said rotor surfaces being mounted on said rotor shaft for rotation therewith.

Preferably there is provided a transfer system to move the second material from the second location to the weed seed destructor section at least one other surface arranged on the transfer device for engaging the accelerated second material such that the accelerated second material is impacted between said rotor surfaces and said at least one other

BRIEF DESCRIPTION OF THE DRAWINGS

One embodiment of the invention will now be described in conjunction with the accompanying drawings in which:

FIG. 3 is an isometric partly exploded view of a part of the shaft and one rotary mill of FIGS. 2 and 2A.

FIG. 4 is an isometric view of the collection and conveying system which carries the chaff and weed seeds from the rear of the sieve to the rotary mills.

In the drawings like characters of reference indicate corresponding parts in the different figures.

DETAILED DESCRIPTION

Figure 1:
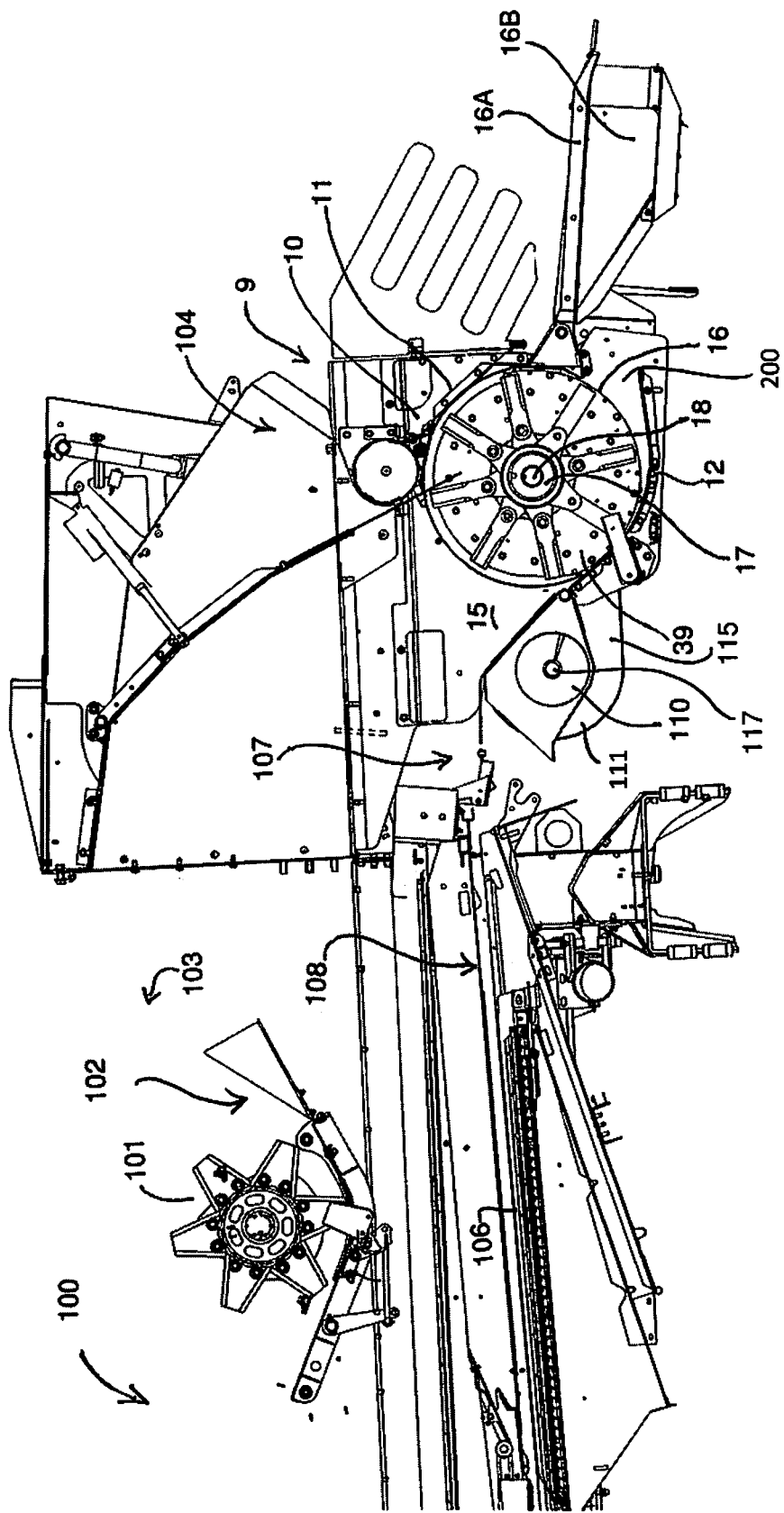
FIG. 1 is a side elevational view of an apparatus for destruction of weed seeds according to the present invention which is arranged in a first embodiment where a rotary mill section is mounted at a position on a combine harvester on a rotary shaft of the conventional straw chopper located in the path of the straw.

The apparatus herein is shown in FIG. 1 mounted on a combine harvester carried on ground wheels and including harvesting components of a conventional nature. This can include in some current embodiments a conventional separator with straw walkers with a threshing cylinder axis perpendicular to the direction of travel, in other embodiments using an axial separator with a rotor axis aligned with the direction of travel and in other embodiments using aligned threshing rotors perpendicular to the direction of travel. Other arrangements are also possible.

In most embodiments, the rearmost part of the separation system is the sieve which allows passage through of harvested seeds for collection and discharges chaff and discarded seeds including weed seeds to the rear edge of the sieve.

Thus the separation system including the threshing system and the cleaning system defined by the sieves operates for separating harvested crop into a first material comprising straw and a second material comprising chaff and weed seeds.

The combine harvester shown in FIG. 1 includes a separating rotor at the location 100 feeding the straw onto a beater or straw chopper rotor 101 which completes a further and final separation before the first material containing the straw is discharged from the separation system at location 102 into a straw path 103 for passage to a discharge from the combine harvester.

Figure 6:
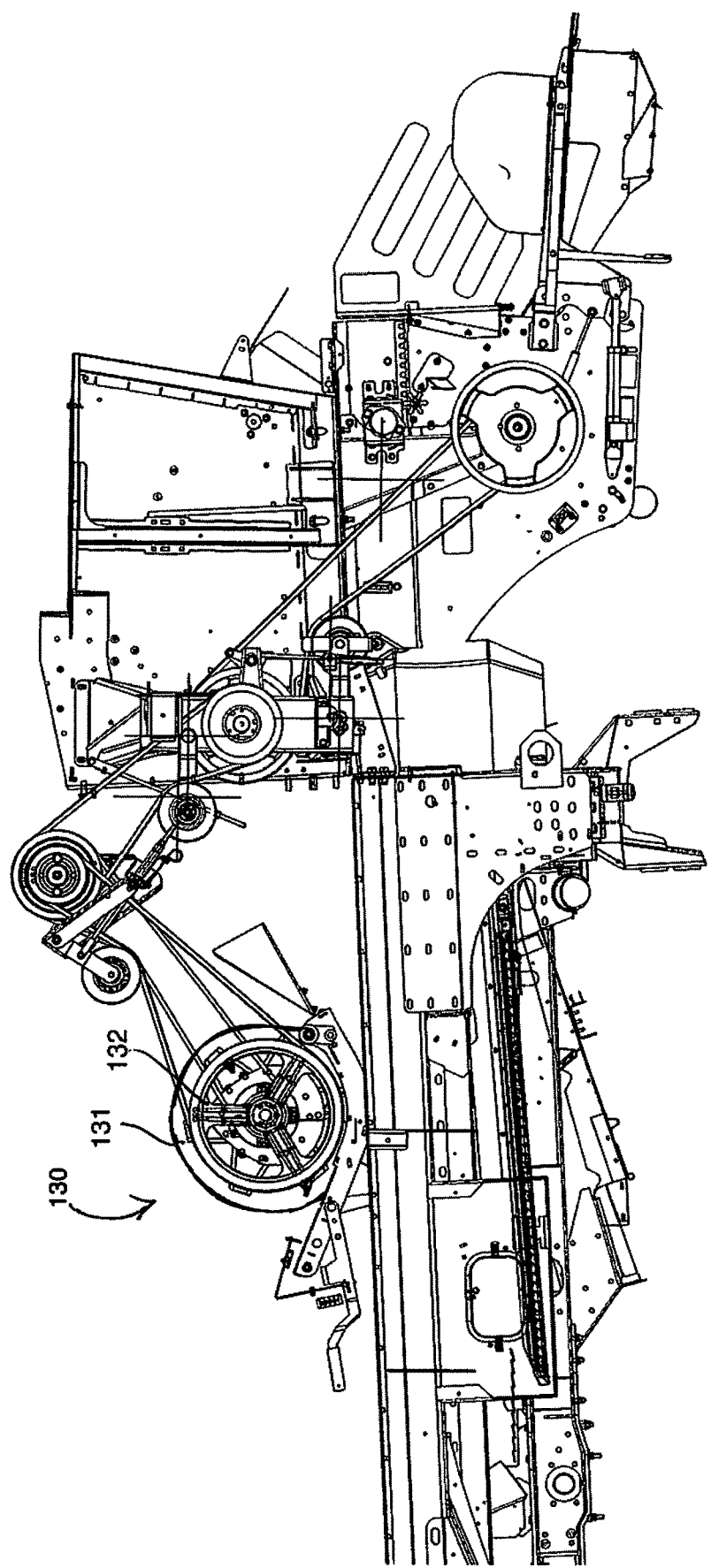
FIG. 6 is a side elevational view of an apparatus for destruction of weed seeds according to the present invention which is arranged in a third embodiment where a rotary mill section is mounted at a position on a combine harvester on a rotary shaft of the conventional internal straw chopper used on some combine harvesters located in the internal area of the combine in the path of the straw.

The combine harvester as shown includes a chopper and discharge arrangement 9 shown in FIGS. 1 and 6 is basically as shown in U.S. Pat. No. 6,840,854 issued Jan. 11 2005 of Redekop, the disclosure of which is incorporated herein by reference. The chopper thus comprises a housing 10 defined by a top wall 11, a bottom wall 12 and two end walls 13. The end walls 13 include attachment means 13A for attachment of the housing 10 to the outlet 104 of a combine harvester for discharge of straw and optionally chaff from the combine harvester into an inlet opening 15 of the housing 10. The bottom wall 12 defines a semi-cylindrical portion extending from the inlet 15 to an outlet 16 through which chopped straw and air is discharged at relatively high velocity for spreading across the field in a wide spread pattern.

Within the housing is mounted a hub 17 including a shaft 17A which is carried on suitable bearings for rotation about a hub axis 18 at a center of the housing. The shaft can form a complete shaft body across the full width or it may be formed from stub shaft portions attached to the hub 17 at each end. Blade members 19 carried by the hub 17 sweep around within the housing to entrap straw fed through the inlet 15 and to carry the straw and air past stationary blades 10A for chopping and for discharge through the outlet 16. The stationary blades are mounted on the housing at a position approximately midway between the inlet 15 and the outlet 16 so that blade members 19 carried on the hub sweep between the stationary blades in a cutting action.

In this arrangement of the chopper, there are provided three axially spaced sections of the chopper assembly including a first fan section 30 at one end of the hub 17 and a second fan section 30 at the other end of the hub 17. In-between the two narrow fan sections 30 is defined a center section 30A which provides the whole of the cutting action.

The chopper and spreading assembly 9 is arranged to be mounted at a rear straw discharge of the combine harvester and includes the housing 10, the rotor 17 mounted in the housing 10 for rotation around a generally horizontal axis and carrying the plurality of chopper blades 19 for chopping the discharge material.

At the exit 16 is provided the material spreading assembly which can be the form of a tailboard 16A with guide fins 16B for receiving the chopped material and spreading the material to the rear and sides of the combine harvester.

Figure 7:
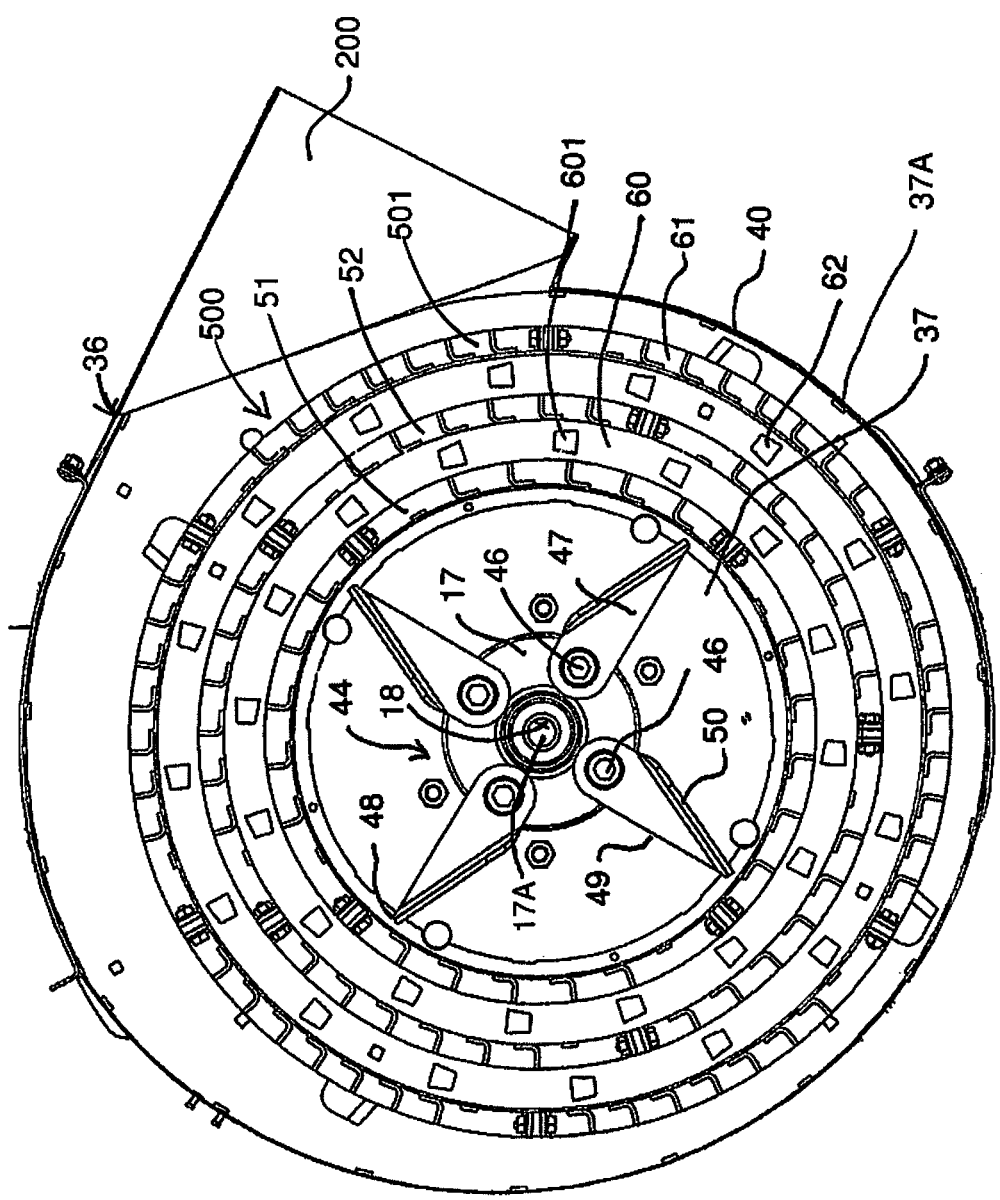
FIG. 7 is an end elevational view of one weed destructor mill of the embodiment of FIGS. 1 to 6.
Figure 8:
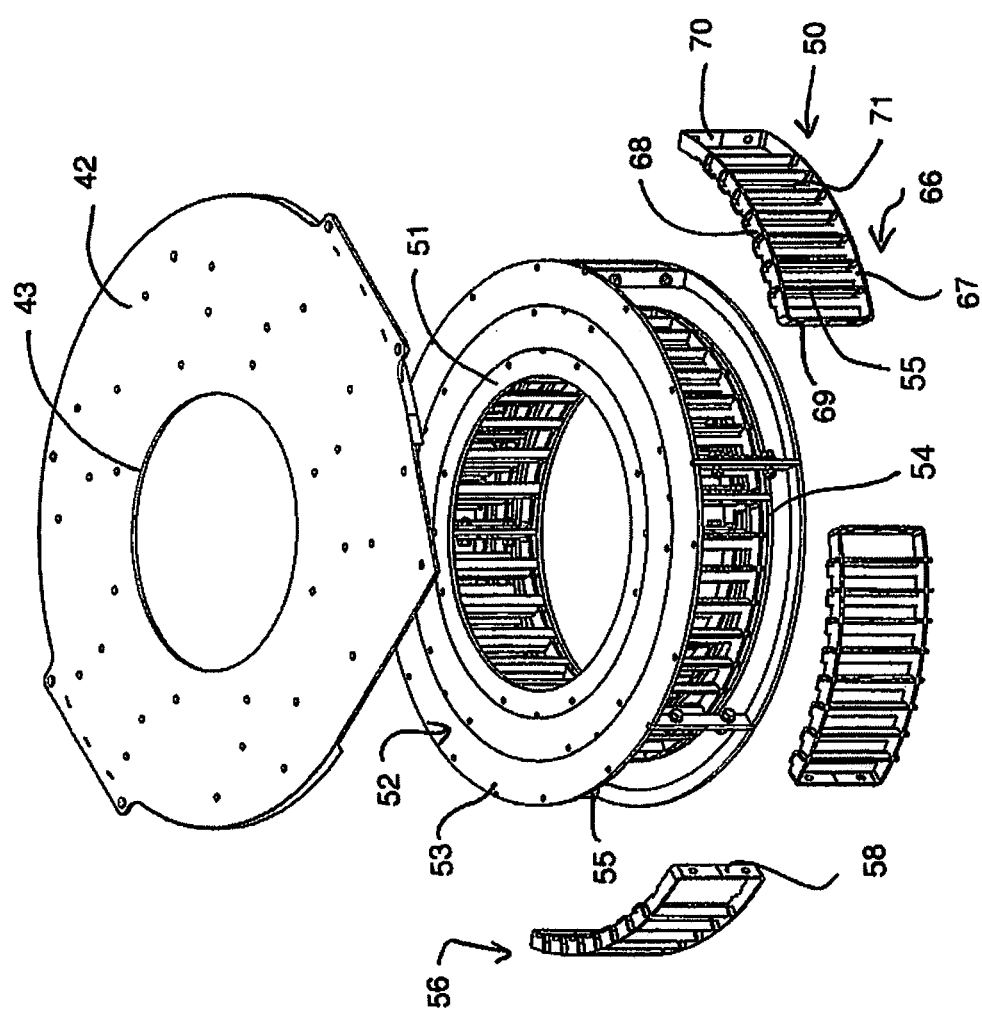
FIG. 8 is an exploded view of the mill of FIG. 7.
Figure 9:
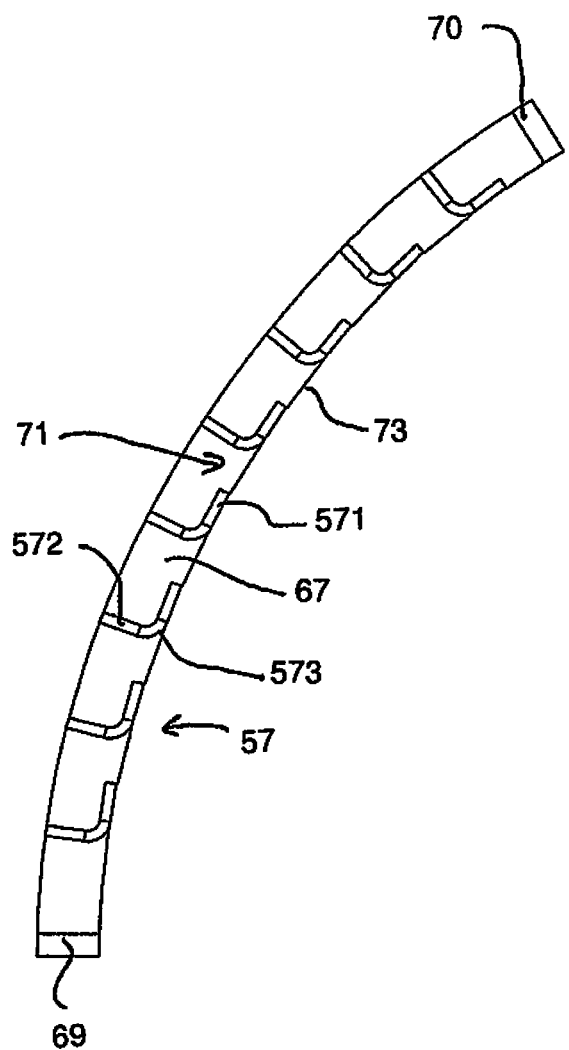
FIG. 9 is a plan view of one stator element of the outer ring of the rotor of the embodiment of FIG. 4.

In this embodiment a seed destructor is provided which includes two separate destructor elements 38, 39 positioned in this embodiment on the shaft 17A of the hub 17 at the ends where the fan sections 30 are located. Each element 38, 39 as best shown in FIG. 7 comprises housing 36 with base 37 at or defined by the end wall 13 of the housing 10. The base 37 and a generally cylindrical outer surface 37A are covered by a cover panel 42. The cover panel (as shown in FIG. 8) is held stationary and includes a central circular inlet 43 for feeding the second material from the sieve containing the chaff and weed seeds onto a rotor 44 mounted on the shaft 17A of the hub 17. Around the shaft 17A is provided a plurality of pivot pins or bolts 46 each carrying a pair of flail blades 47. The flail blades extend from an inner end with a plurality of fingers extending into connection to the pin 46. An outer end of the flail blade 45 broadens in the axial direction of the axis 18 of the hub and terminates in an edge 48 lying in an imaginary cylindrical surface surrounding the axis. The flails can retract inwardly by pivotal movement in the event of impact with a larger object. Thus the blades 47 are pivotally mounted about an axis parallel to the rotor axis so as to act as flails. Also each of the rotor blades include a sharpened cutting edge 49 radial to the axis and a fan blade portion 50 generally axial of the axis. The fan blades 50 of the mill act to generate a significant air flow through the mill to the outlet 200 of the mill. The outlet 200 directs the outlet air onto the tailboard 16 and the fins thereon to supplement the stream of air and straw from the blades 19. In this way the mills act in the same manner as the fan blade sections shown in the above cited U.S. Pat. No. 6,840,854 of Redekop. It will be appreciated therefore that the addition of the stator portions of the mill to the fan end sections of the straw chopper rotor enable the straw chopper to carry out both functions of straw chopping and milling the chaff together with the spreading of both materials. This provides a system of high efficiency with low numbers of moving parts to enable the construction of a device at lower cost.

Around the rotor is provided a stator 500 formed by a number of stationary annular coaxial cylinders 51 and 52 and optionally 501 with cylinder 51 inside the cylinder 52. The stator cylinders are carried on the stationary end wall 37 so that they project into the rotor 44. The cover forces the weed seeds to contact the stator 500 and rotor 44 to be impacted thereby thus devitalizing the seed.

Each stator cylinder is of the construction shown in FIGS. 7 and 8 and includes a top flange 53, a bottom ring 54 parallel to the flange and a plurality of upstanding connecting posts or bars 55 to form a rigid structure.

The stator cylinder 51, 52 can optionally be formed from a plurality of inserts 56 closing the space between the flange 53 and the bottom ring 54. Each insert forms a part cylindrical surface which extends around the axis by a limited angle. As shown in FIG. 8 there are six such inserts each covering an angle of the order of 60 degrees so that the plurality of inserts cooperate to partly surround the axis. The inserts may be manufactured with different numbers and widths of stator bars so as to be made with larger openings between the stator bars. The combination of inserts can be selected to increase or decrease the number of openings or additional release points.

Each insert 56 has a plurality of the stator bars 55 parallel to the rotor axis. Different constructions of inserts can be provided with different numbers and dimensions of bars to provide a different grinding or impacting effect on the material in engagement with the inserts. The inserts are shaped with an angled edge flange 58 which is shaped to engage against a side edge of a suitably shaped one of the rails 55. Thus as shown in FIG. 8, the ends 58 of the plates 56 engage against sides of the bars 55. In FIG. 8, three types of inserts are shown, of which many more styles could be envisioned, which can be selected for use in the base frame of FIG. 7.

In operation, the rotor flails 47 act to suck chaff and weed seed into the mills through the inlet opening 43 in the cover 42 and accelerate and direct the material across the inside surface of the inner stator ring 51 to impact, shear and force some of the material through the spaces between the bars 55. The outer edge 48 of the flail blade thus acts to wipe the material cross the inside surface of the selected insert with the edge 48 having a height substantially matching the height of the insert 56.

That material which does not escape through the spaces between the bars 55 is carried around the inner surface of the insert 56 to the next one of a plurality of discharge slots or spaces between the bars 55. The material sliding on the inner surface thus can escape through the inner stator ring 51 to the next outer annular stator 52. Between the two stators 51, 52 is an annular rotor 60 defined by ring of posts 601 which are attached to a base plate of the rotor so as to rotate with the shaft 17A of the center hub 17 and with the flail blades 47 attached to the shaft. These posts 601 act to impact, accelerate and shear the material round the inside surface of the outer stator 52. The arrangement can also include a third stator 501 coaxially surrounding the stator 52 with a further rotor 62 of a similar structure to rotor 60 between the stators 52 and 501.

The stator 501 has the same structure as the stators 51 and 52 but of increased diameter. Again there is a plurality of separate inserts 56 at angularly spaced positions. The outer stator therefore operates in the same manner under the rotation impetus on the material from the posts of the rotor 62 to impact and shear the material and then to allow any remaining material remaining on the inner surface of the outer stator to escape outwardly. The material escaping is flung outwardly and angularly against the outer surface 40.

Each stator which is in the form of a ring or cylinder supported from the top cover and located between the components of the rotor is thus formed from the fixed base frame shown in FIG. 7 with a plurality of locations each for mounting a respective one of the stator insert components with an outlet opening between each plate or between each stator bar of the plate and the next. As shown in FIG. 8, different forms of the stator inserts can then be selected for use with the frame of FIG. 7 and installed and replaced as required. The stators can also be formed from annular components fully surrounding the axis without the individual part cylindrical inserts of FIG. 8.

The use of separate stator inserts provides replaceable stator components which have a number of advantages which include:

—a— simple service, it is possible to replace and discard small parts of the stator rather than the entire stator ring.

—b— customer cost, the arrangement provides lower cost service parts, longer lasting parts with the possibility that the smaller parts of the components alone can be made harder.

—c— manufacturing advantage, the components individually are lower cost, higher volume of a smaller part allowing economy of scale to provide lower cost manufacturing.

—d— material, the manufacture of a smaller part allows the use of a higher value material for that part while the frame itself can be manufactured from other materials. This allows less material to be used, allows for harder or heat treatable material to be used for the wear surfaces of the replaceable stator components while softer, more ductile or weldable material can be used in the frame. In particular the stator components or inserts form small parts which are suitable for hard surfacing or carbide coating processes to provide increased hardness and wear resistance.

—e— Stator selection; this allows for different stator profiles, that is different shapes and arrangements of holes, to be selectable to best match to typical weed seed targets in each farming region. That is different regions in the world have different weed problems, so that the system of the present invention allows use of a common support frame and different wear inserts to best target the efficacy of the desired weed seed in that region.

—f— Stator Style; the system can provide different styles of stator inserts to cover different manufacturers particular design of the stator.

The stator bars 57 of the replaceable stator inserts 56 may be hard surface coated with a suitable material such as carbide which reduces impact damage. One or all stators 51, 52 and 501 defined by the annular frame and the supported stator components can be adjusted by rotation around the axis of the rotor so as to move the position of the openings between the plates. This acts to change the distance that the material must traverse before it reaches the escape slot, or a position where the stator bars are spaced a greater distance apart.

The angular position of the stators 51 and 52 is adjustable around the axis 17A of the hub to move the openings angularly. If the openings of the inner stator are located at an angular portions so that they are aligned with the openings of the outer stator then any material exiting the openings of the inner stator will typically escape from the second stator by direct radial movement through both openings simultaneously thus minimizing any processing by the outer stator. Movement of one or both of the stators so that the openings are not aligned will increase the effective processing by the second outer stator. It will be appreciated that this processing can be adjusted from a position of minimum processing where the opening are aligned to a position of maximum processing where each opening in the inner stator discharges onto the outer stator at a distance which is at the beginning of the adjacent stator component so that the material must traverse the whole surface of the component before reaching the next opening in the outer stator. The actuators are operated by a control where the control is in the cab for on-the-go control of the position of the stators.

It will be appreciated that the weed destructor herein uses a significant amount of power to drive when empty and an increased amount when filled with the crop materials. This power can be minimized by bypassing the device as described herein and by disconnecting the drive thereto when no treatment of the crop materials is required. Couplings between the rotor shaft 17A and the seed destruction rotors are decoupled to allow only the rotor to turn. Alternatively, if the seed destruction rotors are not decoupled the power can be reduced as above by moving the stators to the most effective position with minimum crop treatment.

Thus the system herein provides adjustability of stator positions on the go, the advantages of which include:

—a— Setting the stator contact surface to produce the best efficacy rate to match weed problems in field while reducing power requirements.

—b— Reducing power by reducing stator contact time of the crop material. This is a significant advantage includes which allows increased combine harvest capacity as current destructor systems are reducing a farmer's threshing capacity by up to 30% as well as reduced fuel consumption.

—c— Manual Adjustment on the go by In Cab control of an actuator allows the operator to change as they enter visible weed problem areas in the field. The actuator drives relative position of the stator rings to change the number of impact surfaces a seed encounters as it passes through the mill.

—d— Automatic Adjustment on the go allows an operator to develop a GPS map of a weed problem by aerial surveillance or when mid-season spraying. This information can be used to adjust the stator positions for maximum seed efficacy using maximum power in that area and reduce contact surface after the combine passes through the weed area.

In an alternate arrangement, in least one stage, the weed seeds do not pass through the stator but are rebounded between the rotor and the stator. The rotor also propels the weed seed from the housing without needing to pass through an outside stator surface so that a higher exit velocity is obtained.

The arrangement herein thus provides at least one stator 51 comprising a plurality of stator inserts 66 including the stator bars 57 at angularly spaced positions around the axis of the rotor. The inserts 66 include bottom and top rails 67 and 68 and end support posts 69 and 70 forming a rectangular rigid structure with the bars 57 welded to the rings 67 and 68 so as to extend at right angles thereto leaving spaces 71 between each bar and the next and between the endmost bars and the posts 69 and 70. Each stator bar thus extends axially along the axis of the rotor and being spaced from a next adjacent stator bar to provide an axially extending space 71 therebetween through which weed seeds can pass.

Each stator bar 55 comprises an elongate member which includes three impact surfaces which can be varied in size and length to vary the number of impacts a weed seed encounters as it passes through each stage of the mill. The stator bar is preferably L-shaped in cross-section to define a first leg 571 lying in a cylindrical surface 73 surrounding the axis of the rotor and a second leg 572 extending outwardly from the cylindrical surface connected to the first leg at an apex 573 at a leading end of the first leg relative to the direction D of rotation of the rotor.

The arrangement herein thus provides a stator bar which includes a tangential surface, an apex at a leading edge of the tangential surface and a third surface which is generally radial whereas previous arrangements typically before have had either a tangential or radial or apex, but not all three and thus provides an advantage over, and differentiator from, the prior art, enabling higher weed seed devitalization rates at lower power requirements.

The stator bar is preferably formed by bending a strip of sheet metal along a center line or approximately at the center line to form the legs 571 and 572 with a smooth curve 573 interconnecting the legs. The apex 573 defines a radius of curvature which can lie in the range 5 to 15 mm and more preferably of the order of 7 mm. However the same surfaces can be formed on the outside of a body which is a solid bar, not a bent strip or on the outside of a hollow bar.

Figure 10:
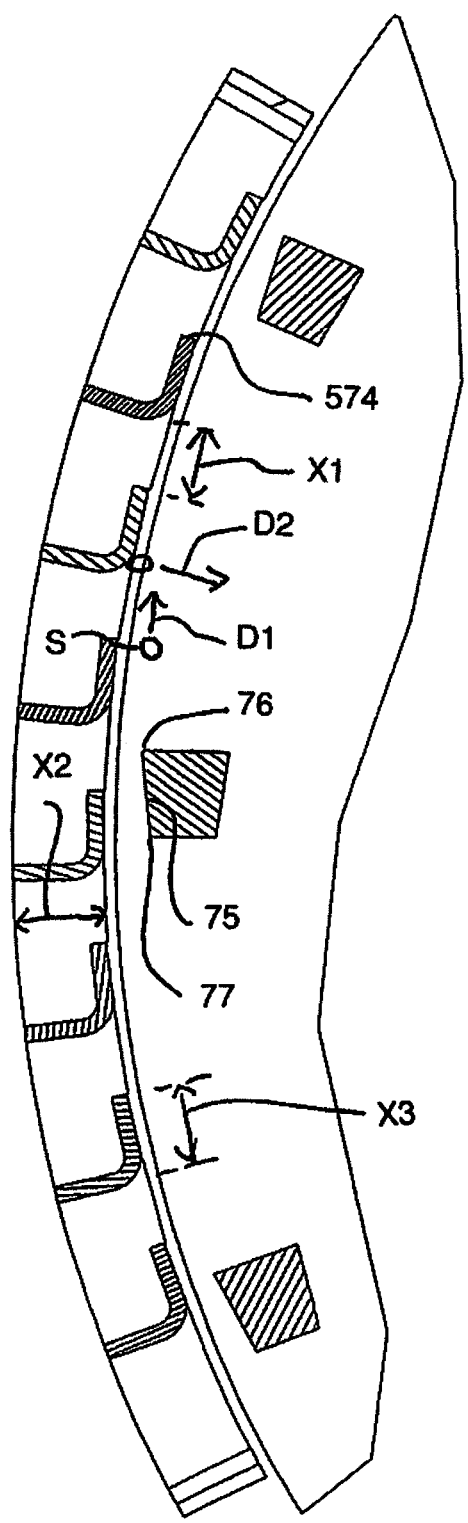
FIG. 10 is a plan view of one stator element of the inner ring of the rotor of the embodiment of FIG. 4.

The apex thus defines a portion 573 of the surface which is at an inclined angle relative to the first leg 571. As shown in FIG. 10, a seed S is carried along in the direction D1 by the rotation of the rotor blade so that it moves around the axis with some outward movement under centrifugal force. Some seeds impact the leg 571 on its inner surface. Some seeds pass through the opening 71 between the trailing end 574 of the leg 571 and the apex 573 of the next stator bar. These seeds and accompanying material will escape outwardly from this stator to the next stator or to the wall or outer surface 40. Some of that material may engage the radial outwardly extending surface of the leg 572 so as to change direction but generally any material impacting the bar outside of the apex will escape outwardly. Some of the seeds and material will impact the bar 57 at the apex 573 and hence will tend to reflect the weed seeds when impacting thereon at an inclined angle back toward the rotor.

Figure 12:
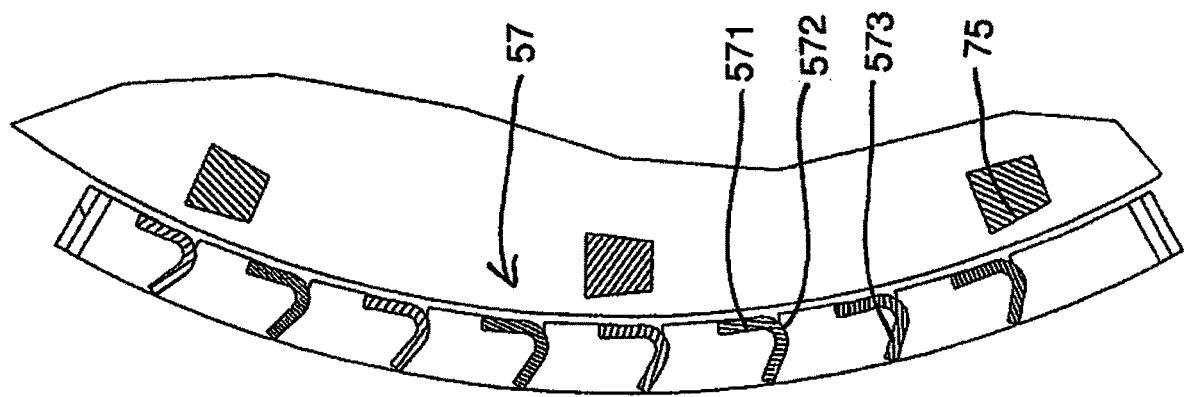
FIG. 12 is a plan view of one stator element of the inner ring of the rotor of the embodiment of FIG. 4 showing a second alternative shape for the stator bars.

The second leg 572 typically lies in an axial plane of the axis of the rotor but in some cases such as that shown in FIG. 12 where the bend in the strip forming the bar is greater than 90 degrees, the leg 572 may be close to or even alongside the leg 571. The legs are typically flat as the only bend in the strip is at the apex.

Figure 11:
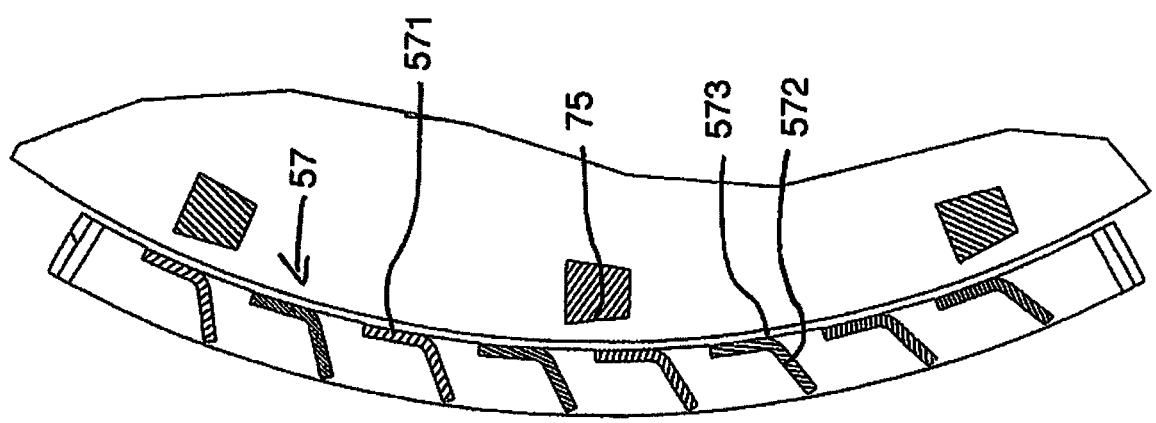
FIG. 11 is a plan view of one stator element of the inner ring of the rotor of the embodiment of FIG. 4 showing a first alternative shape for the stator bars.

Alternately the second leg 572 could be bent less than 90 degrees as shown in FIG. 11 so that the angle between the two legs is greater than 90 degrees. In this case all three surfaces would tend to reflect the seed back to the rotor and therefore would create more impacts as the seeds pass through the mill but with a greater power requirement.

The width of the first leg in the cylindrical surface 73 as indicated at X3 is in the range 10 to 30 mm and preferably of the order of 20 mm.

The width of the second leg in the outward direction as indicated at X2 is in the range 10 to 30 mm and preferably of the order of 20 mm. This provides an arrangement in which all the second legs are of the same length with the outer edge thereof lying in an imaginary cylinder 74.

The width of the space 71 in the cylindrical surface 73 as indicated at X1 is in the range 10 to 30 mm and preferably of the order of 20 mm.

In order to prevent the outer edge or the blade of the rotor from pinching material against the legs in the cylinder 73, the rotor comprises a plurality of blades where an outer surface 75 of each blade has a leading edge 76 which is closest to the cylindrical surface 73 and tapers away from the cylindrical surface toward a trailing edge 77.

In the embodiment of FIGS. 1 to 4, therefore there is provided a combine harvester including a separation system with a threshing rotor 100 and a sieve arrangement 106 for separating from the harvested crop cut by the front header at the first discharge location 103 the first material comprising straw and at a second discharge location 107 the second material including chaff and weed seeds. A transfer surface 108 can be provided to carry the second material to the second location 107.

As described above, the combine includes the straw chopper 9 which has the hub 17 mounted on a shaft 17A defining a rotor mounted on the combine harvester the rear discharge on the combine to engage the first material including the straw.

The rotor or hub 17 as described above includes the chopping blades 19 of the conventional straw chopper so that the rotor surfaces are mounted on the rotor shaft 17A and hub 17 for rotation therewith.

In this arrangement the chopper includes two weed seed destructor sections 38, 39 each arranged inside the end wall of the housing at the end section of the rotor. Each of these includes the rotor 44 mounted for rotation about the axis of the shaft 17A to engage the chaff and weed seeds fed from the location 107 by the arrangement described hereinafter for accelerating the material in the direction outwardly from the axis to engage the stator 51, 52 arranged around the rotor surfaces including one or more rotor surfaces 60, 62 for engaging the material such that the material and particularly the weed seeds are impacted between the rotor surfaces and the stator surfaces.

Figure 2:
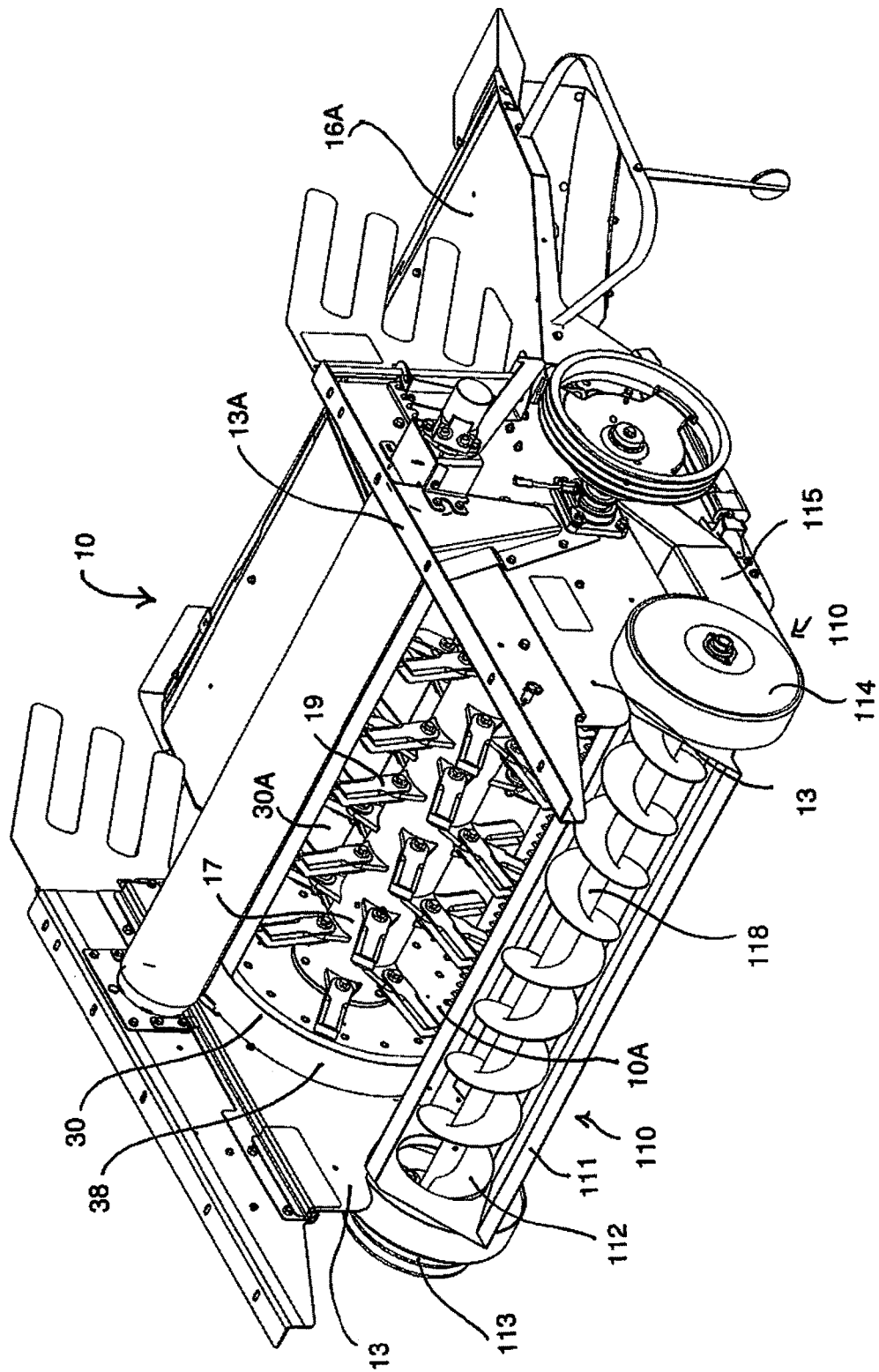
FIG. 2 is an isometric view of the apparatus for destruction of weed seeds of FIG. 1 which shows the location of the rotary mill.
Figure 2A:
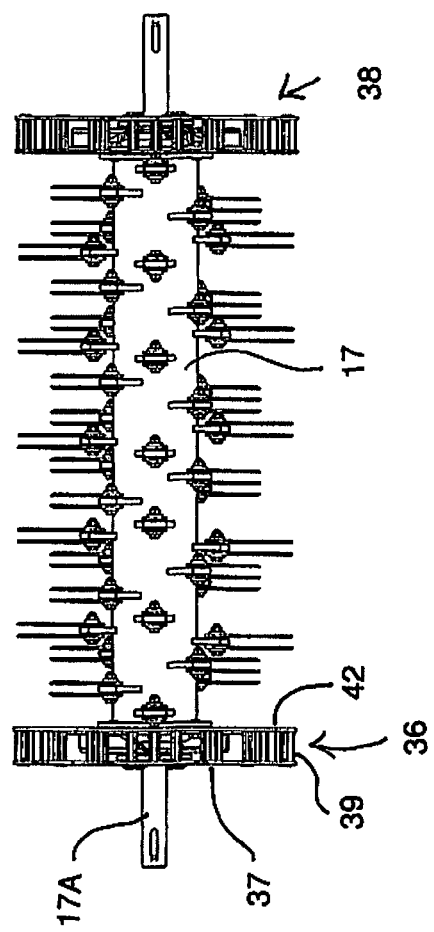
FIG. 2A is a top plan view of the shaft and rotary mills of FIGS. 1 and 2.

As shown in FIGS. 2 and 4, there is provided a transfer system generally indicated at 110 to move the second material including the weed seeds from the second location 107 to the weed seed destructor section defined by the two destructors 38 and 39. The transfer system comprises a transverse tubular housing 111 containing an auger flight 112 on a shaft 118 separated at the middle so as to carry material from the center toward each end as the auger flight rotates.

The housing for the auger flighting is designed so that the bottom of the housing is not tight to the auger flighting. The high speed of the auger flighting acts to drive any heavy objects, rocks or metal, into the void which thus acts as a rock trap allowing the auger to only move the lighter chaff to the destructors.

At each end of the flight is provided a respective blower 113, 114 in a cylindrical housing including fan blades driven by the shaft 117 of the auger. The shaft is driven by a belt drive system from the drive to the chopper 9. The transfer drive system includes a coupler to engage or disengage the drive to save power when the system is not required to be used. The transfer system also includes a bypass mechanism to allow the second material to bypass the system when it is not in use. The transfer thus includes at least a blower arrangement 113, 114 for blowing the second material along a respective duct 115, 116. The ducts extend along the outer face of the housing of the chopper and discharge the second material through the opening 43 in the end wall 42 (FIG. 8) to enter the middle of the rotor 44 of the destructor 38, 39. An alternative transfer system could be providing an air blower system which avoids the necessity for any mechanical movement to blow the material into a chopper destructor or an auger system such which uses two auger flights to move the chaff and weed seeds to the required location without the necessity for air flow. Many other material transfer systems could be utilized.

That is the rotor shaft 17A and the transfer system including the shaft 117 are both driven by a belt for receiving drive from an output shaft of the combine harvester so that there is a common drive from the combine harvester to the chopper rotor of the straw chopper section and the shaft 117 of the transfer system. Alternately the low power requirement for the transfer device allows the device to be driven by a hydraulic motor to provide the simple command afforded by electro-hydraulic controls.

It will be noted from FIG. 1 that the transfer system 110 has an intake in front of a housing of the rotor of the chopper 9 with the housing 111 being mounted on or as part of the housing of the straw chopper rotor.

Thus the transfer system includes the auger flight arrangement for moving the second material outwardly to one or both sides of the combine harvester to the blower arrangement and duct to convey the second material to the rotor seed destruction section.

In another embodiment (not shown) the auger may be arranged to carry the second material only to one side where a single blower and single duct can carry the second material to a destructor at one end only of the hub 17. In this arrangement the single destructor can be mounted on the chopper shaft 17A or on any other driven shaft within the straw flow path.

In another embodiment (not shown but based on the embodiment shown in FIG. 1) a construction of the type shown in the above cited patent document of TecFarm can be provided where one rotor 24 (See numbers in TecFarm Figure) is mounted on the shaft 117 and the second rotor 26 is mounted on the shaft 17 with the housing 12 surrounding the two rotors. Where two such mills are required, one can be mounted at one end of the shafts 17, 117 and the other at the other end with each mill being fed by the auger mounted on the shaft 117.

The arrangement shown is particularly effective in that the destructor sections are mounted in the chopper housing 10 without significantly increasing the width of the structure. That is the chopper rotor remains of the same width as the straw path. Only the blowers 113 and 114 and the associated ducts 115, 116 are mounted outside the width of the chopper housing. Alternatively, the blowers 113, 114 could be mounted in the same plane as the destructor rotors 38, 39 so that only the ducts 115, 116 are outside the chopper width utilizing a narrow configuration and a small amount of space on the combine harvester.

Also the weed seed destructors 38 and 39 generate an air flow volume and rate somewhat similar to that of the conventional fans of the conventional Redekop chopper (of the type shown in the abovementioned patent) so that the total volume of air generated and fed onto the tail board with the combined first and second materials for spreading is equal to or even greater than that of the conventional chopper.

The destructors 38 and 39 are located in the separate sections at the ends of the rotor so that they do not interfere with the conventional straw chopping action of the rotor.

The weed seed destructors are arranged to expel the second material into a secondary spreading device. In the embodiment shown this is the tailboard. However other arrangements may use a rotary spreading system. This can be used where the air flow is insufficient to generate the required spread such as where the straw chopping section is internal to the combine rather than the dedicated rear chopper shown.

Figure 5:
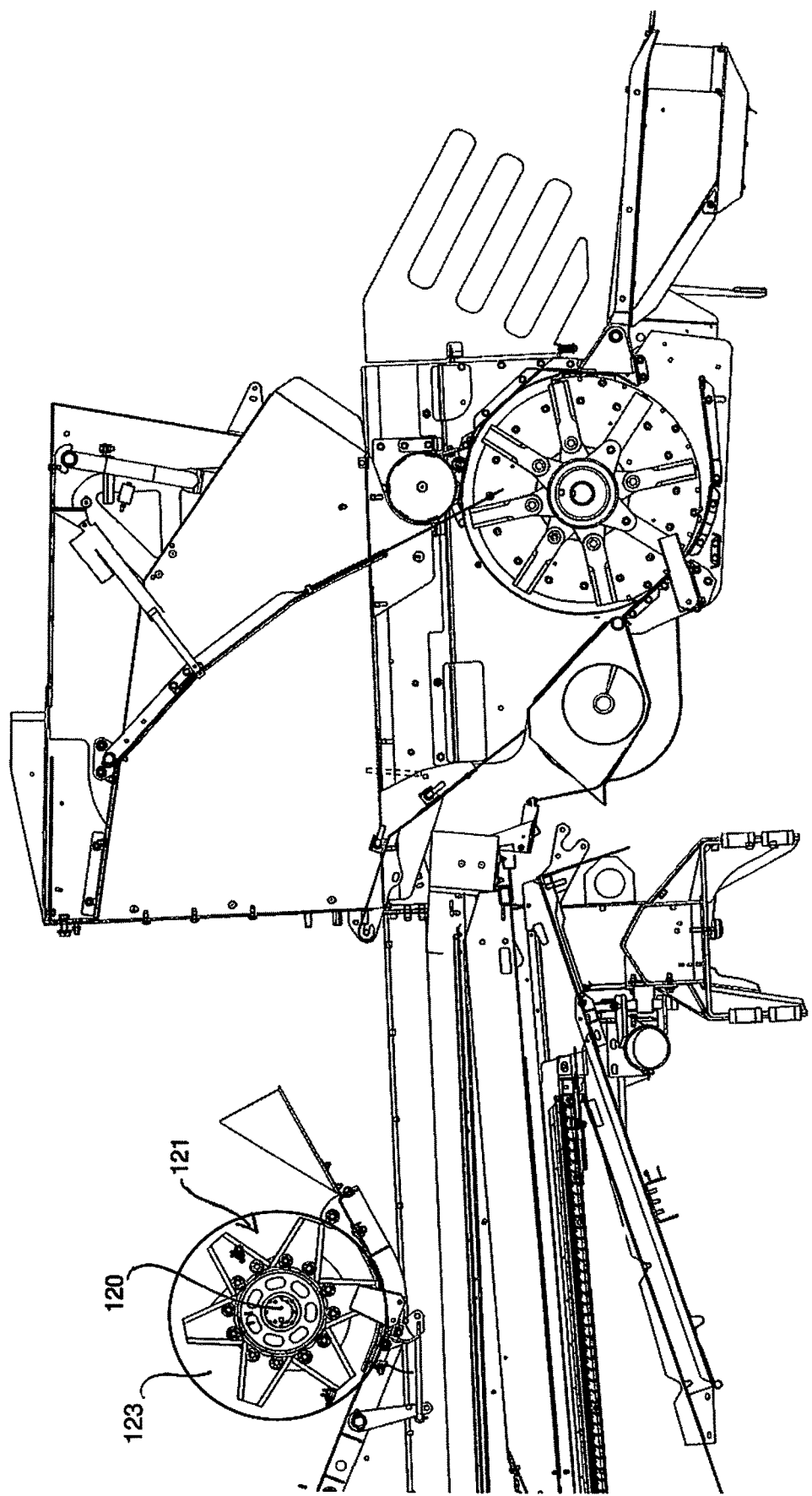
FIG. 5 is a side elevational view of an apparatus for destruction of weed seeds according to the present invention which is arranged in a second embodiment where a rotary mill section is mounted at a position on a combine harvester on a rotary shaft of the conventional straw discharge beater located in the internal area of the combine.

In the embodiment shown in FIGS. 1 to 4, the rotor is the rear straw chopper so that the transfer system can be mounted in front of the chopper housing. However as shown in FIG. 5, in an arrangement where there is no rear straw chopper, or there is not an efficiency in mounting the weed seed destructor to the rear chopping rotor, the shaft mounting the weed seed destructors can be the shaft 120 of the internal discharge beater 121 of the combine. Again the destructor can be located with two end annular members 123 on the shaft 120 within the width of the combine housing. Also a single destructor 123 can be mounted on the shaft 120 at one end in which case the destructor may be outside the housing.

In yet another arrangement shown in FIG. 6 the destructor 131 is mounted to the shaft 132 of an internal straw chopper 130. In both these cases, again the second material can be collected by an auger and fan arrangement such as that in FIG. 4 but the ducts extend forwardly to a location at the respective cross shaft within the combine.

In yet another arrangement the destructor shown in FIG. 6 a destructor 131 is mounted to an independent cross shaft 132. In both these cases, again the second material can be collected by a transfer device such as an auger and fan arrangement such as that in FIG. 4 but the ducts extend to the location at the respective cross shaft within the combine.

In yet another arrangement (not shown) a rotor of the destructor is mounted to the shaft 17A and a second rotor surface is mounted on the shaft 118 of the transfer device. The second material can be collected by a transfer device such as an auger and fan arrangement such as that in FIG. 4 but the ducts extend to the location at the respective cross shaft within the combine.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A combine harvester comprising:
a separation system including a threshing system which separates harvested crop into a first material stream comprising straw and a second material stream comprising chaff and weed seeds;
a rotary member mounted on a rotor shaft on the combine harvester;
wherein the rotary member carries a plurality of straw engaging members engaging the straw in the first material stream;
and at least one weed seed destructor section comprising:
an inlet receiving the second material stream comprising the chaff and weed seeds;
first rotor and second stator surfaces engaging the chaff and weed seeds;
the first rotor and second stator surfaces being mounted so as to provide rotation of the first rotor surfaces relative to the second stator surfaces causing the chaff and weed seeds to be impacted between said first rotor and second stator surfaces so that the weed seeds in the second material are devitalized before being spread onto the ground;
wherein the first rotor surfaces of the destructor section are mounted on the rotor shaft of the rotary member so as to be driven thereby.

2. The combine harvester according to claim 1 wherein said at least one destructor section is located at a position on the rotor shaft axially separated from the straw engaging members.

3. The combine harvester according to claim 1 wherein said at least one destructor section is located at an end of the rotary member.

4. The combine harvester according to claim 3 wherein said at least one destructor section comprises a first destructor section at a first end of the rotary member and a second destructor section at a second end of the rotary member.

5. The combine harvester according to claim 1 wherein the rotary member is a rear straw chopper.

6. The combine harvester according to claim 1 wherein the rotary member is an internal straw chopper.

7. The combine harvester according to claim 1 wherein the separation system includes at least one sieve which discharges the second material stream from the sieve at a discharge location, wherein there is provided a transfer system moving the second material stream from the discharge location to the inlet of said at least one weed seed destructor section.

8. The combine harvester according to claim 7 said transfer system comprises at least one transfer duct and a blower arrangement for blowing the second material along the transfer duct to said inlet of said at least one destructor section.

9. The combine harvester according to claim 7 wherein said transfer system comprises a conveyor moving the second material stream outwardly to at least one side location on the combine harvester and at least one transfer duct which conveys the second material stream from an end of the conveyor at said at least one side location rearwardly of said side location to said inlet of said at least one seed destructor section.

10. The combine harvester according to claim 9 wherein said conveyor comprises an auger flight which is mounted on a shaft at the discharge location of said at least one sieve.

11. The combine harvester according to claim 9 there is provided at least one blower arrangement for blowing the second material along the transfer duct to said inlet of said at least one destructor section said wherein said conveyor is mounted on a shaft which drives said at least one blower arrangement.

12. The combine harvester according to claim 9 wherein said at least one blower arrangement and said at least one transfer duct are located outwardly of an end wall of a housing of the rotary member.

13. A combine harvester comprising:
a separation system including a threshing system which separates harvested crop into a first material stream comprising straw and a second material stream comprising chaff and weed seeds;
a rotary member mounted on the combine harvester for rotation about a rotary axis;
wherein the rotary member carries a plurality of straw engaging members engaging the straw in the first material stream;
and at least one weed seed destructor section comprising:
an inlet receiving the chaff and weed seeds in the second material stream;
first rotor surfaces engaging the chaff and weed seeds in the second material stream;
the first rotor surfaces being mounted for rotation about a rotor axis of the weed seed destructor section;
second stator surfaces engaging the chaff and weed seeds in the second material stream;
the first rotor surfaces being mounted so that said rotation of the first rotor surfaces relative to the second stator surfaces causing the chaff and weed seeds to be impacted between said first rotor and second stator surfaces so that the weed seeds in the second material are devitalized before being spread onto the ground;
wherein the rotor axis of the weed seed destructor section is co-axial with the rotary axis of the rotary member.

14. The combine harvester according to claim 13 wherein said at least one destructor section is located at a position axially separated from the straw engaging members.

15. The combine harvester according to claim 13 wherein said at least one destructor section is located at an end of the rotary member.

16. The combine harvester according to claim 13 wherein said at least one destructor section comprises a first destructor section at a first end of the rotary member and a second destructor section at a second end of the rotary member.

17. The combine harvester according to claim 13 wherein the rotary member is a rear straw chopper.

18. The combine harvester according to claim 13 wherein the rotary member is an internal straw chopper.

19. The combine harvester according to claim 13 wherein the separation system includes at least one sieve which discharges the second material comprising the chaff and weed seeds from the sieve at a discharge location and wherein there is provided a transfer system moving the second material stream from the discharge location to the inlet of said at least one weed seed destructor section.

20. The combine harvester according to claim 19 wherein said transfer system comprises at least one transfer duct and at least one blower arrangement blowing the second material stream along said at least one transfer duct to said inlet of said at least one destructor section.

21. The combine harvester according to claim 19 wherein said transfer system comprises a conveyor moving the second material stream outwardly to at least one side location on the combine harvester and wherein there is provided at least one transfer duct which conveys the second material stream from said end of the conveyor at said at least one side location rearwardly of said side location to said inlet of at least one seed destructor section.

22. The combine harvester according to claim 21 wherein said conveyor comprises an auger flight which is mounted on a shaft at the discharge location of said at least one sieve.

23. The combine harvester according to claim 20 wherein said at least one blower arrangement and said at least one transfer duct are located outwardly of an end wall of a housing of the rotary member.

24. A combine harvester comprising:
a separation system including a threshing system which separates harvested crop into a first material stream comprising straw and a second material stream comprising chaff and weed seeds;
the separation system including at least one sieve on the combine harvester which discharges the second material stream from the sieve at a discharge location;
at least one weed seed destructor section on the combine harvester comprising:
an inlet receiving the second material stream;
first rotor and second stator surfaces engaging the chaff and weed seeds in the second material stream;
the first rotor and second stator surfaces being mounted so as to provide of the first rotor surfaces relative to the second stator surfaces causing the second material stream to be impacted between said first rotor and second stator surfaces so that the weed seeds in the second material are devitalized before being spread onto the ground;
and a transfer system moving the second material stream from the discharge location on the combine harvester to said inlet of said at least one weed seed destructor section on the combine harvester;
wherein said transfer system comprises at least one transfer duct and a blower arrangement blowing the second material stream along the transfer duct to said inlet of said at least one destructor section.

25. The combine harvester according to claim 24 wherein said transfer system comprises a conveyor moving the second material stream outwardly to at least one side location on the combine harvester at an end of the conveyor and wherein said at least one transfer duct conveys the second material stream from said end of the conveyor at said at least one side location rearwardly of said side location to said at least one seed destructor section.

26. The combine harvester according to claim 25 wherein said conveyor comprises an auger flight which is mounted on a shaft at the discharge location of said at least one sieve.

27. The combine harvester according to claim 25 wherein said conveyor is mounted on a shaft which drives said blower arrangement.

28. A combine harvester comprising:
the separation system including at least one sieve on the combine harvester which discharges the second material stream from the sieve at a discharge location;
at least one weed seed destructor section on the combine harvester comprising:
an inlet receiving the second material stream;
first rotor and second stator surfaces engaging the chaff and weed seeds in the second material stream;
the first rotor and second stator surfaces being mounted so as to provide of the first rotor surfaces relative to the second stator surfaces causing the second material stream to be is impacted between said first rotor and second stator surfaces so that weed seeds in the discharged chaff can be devitalized before being spread onto the ground;
and a transfer system moving the second material stream from the discharge location on the combine harvester to said inlet of said at least one weed seed destructor section on the combine harvester;
wherein said transfer system comprises a conveyor moving the second material stream outwardly to at least one side location on the combine harvester at an end of the conveyor and at least one transfer duct which conveys the second material stream from said end of the conveyor at said at least one side location rearwardly of said end of the conveyor at said side location to said inlet of said at least one seed destructor section.

29. The combine harvester according to claim 28 wherein said conveyor comprises an auger flight which is mounted on a shaft at the discharge location of said at least one sieve.

\* \* \* \* \*